United States Patent
Wang et al.

(10) Patent No.: US 10,506,244 B2
(45) Date of Patent: Dec. 10, 2019

(54) METHOD AND APPARATUS FOR VIDEO CODING USING ADAPTIVE TILE SIZES

(71) Applicant: QUALCOMM Incorporated, San Diego, CA (US)

(72) Inventors: Xianglin Wang, San Diego, CA (US); Chengjie Tu, San Diego, CA (US); Wei-Jung Chien, San Diego, CA (US); In Suk Chong, San Diego, CA (US); Siping Tao, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 14/794,360

(22) Filed: Jul. 8, 2015

(65) Prior Publication Data

US 2016/0261872 A1    Sep. 8, 2016

Related U.S. Application Data

(60) Provisional application No. 62/129,297, filed on Mar. 6, 2015.

(51) Int. Cl.
*H04N 19/187* (2014.01)
*H04N 19/70* (2014.01)
(Continued)

(52) U.S. Cl.
CPC ......... *H04N 19/187* (2014.11); *H04N 19/119* (2014.11); *H04N 19/14* (2014.11);
(Continued)

(58) Field of Classification Search
CPC ...... H04N 19/187; H04N 19/70; H04N 19/31; H04N 19/172; H04N 19/14; H04N 19/119
See application file for complete search history.

(56) References Cited

U.S. PATENT DOCUMENTS 8,644,344 B2   2/2014   Wiegand
9,521,418 B2  12/2016   Chen et al.
(Continued)

FOREIGN PATENT DOCUMENTS

CN   102948145 A   2/2013
CN   103718553 A   4/2014
(Continued)

OTHER PUBLICATIONS

Ahn Y-J., et al., "Complexity Model Based Load-balancing Algorithm for Parallel Tools of HEVC," 2013 Visual Communications and Image Processing (VCIP), IEEE, Nov. 17, 2013 (Nov. 17, 2013), pp. 1-5, XP032543726, DOI: 10.1109/VCIP.2013.6706451.
(Continued)

*Primary Examiner* — Dave Czekaj
*Assistant Examiner* — Berteau Joisil
(74) *Attorney, Agent, or Firm* — Procopio, Cory, Hargreaves and Savitch LLP

(57) ABSTRACT

Systems and methods for encoding and decoding video data are disclosed. The method can include signaling in syntax information a picture parameter set (PPS) indicating a first tile size partition. The method can also include storing a plurality of tile size partitions and associated PPS identifiers (PPSID) in a database. If a second tile size partition for a second frame of video data is the same as a tile size partition stored in the database, the method can include signaling the PPSID for the corresponding tile size partition. If the second tile size partition is not the same as a tile size partition stored in the database, the method can include signaling a new PPS with the second tile size partition. The system can provide an encoder and a decoder for processing the video data encoded by the method for encoding video data.

30 Claims, 7 Drawing Sheets

(51) Int. Cl.
  *H04N 19/119* (2014.01)
  *H04N 19/172* (2014.01)
  *H04N 19/14* (2014.01)
  *H04N 19/31* (2014.01)

(52) U.S. Cl.
  CPC .......... *H04N 19/172* (2014.11); *H04N 19/70* (2014.11); *H04N 19/31* (2014.11)

(56) References Cited

U.S. PATENT DOCUMENTS

| | | | |
|---|---|---|---|
| 2008/0181498 A1* | 7/2008 | Swenson | G09G 5/14 382/173 |
| 2013/0195173 A1 | 8/2013 | Wang et al. | |
| 2013/0287115 A1* | 10/2013 | Wang | H04N 19/70 375/240.18 |
| 2013/0308709 A1* | 11/2013 | Norkin | H04N 19/00 375/240.25 |
| 2014/0161187 A1 | 6/2014 | Zhang et al. | |
| 2014/0169450 A1 | 6/2014 | Wahadaniah et al. | |
| 2014/0294067 A1 | 10/2014 | Li et al. | |
| 2016/0014407 A1 | 1/2016 | Pu et al. | |
| 2017/0127086 A1 | 5/2017 | Lai et al. | |

FOREIGN PATENT DOCUMENTS

| | | |
|---|---|---|
| CN | 104170384 A | 11/2014 |
| EP | 1589760 A1 | 10/2005 |
| WO | 2013016233 A1 | 1/2013 |
| WO | 2013116348 A1 | 8/2013 |
| WO | 2013162454 A1 | 10/2013 |

OTHER PUBLICATIONS

Partial International Search Report—PCT/US2016/016387—ISA/EPO—dated Apr. 28, 2016.

Wiegand T., et al., "Overview of the H.264/AVC Video Coding Standard," IEEE Transactions on Circuits and Systems for Video Technology, IEEE Service Center, Piscataway, NJ, US, vol. 13, No. 7, Jul. 1, 2003 (Jul. 1, 2003), pp. 560-576, XP011221093, ISSN: 1051-8215, DOI:10.1109/TCSVT.2003.815165.

International Search Report and Written Opinion—PCT/US2016/016387—ISA/EPO—dated Aug. 8, 2016.

Boyce J., et al., "SEI Message for Sub-Bitstream Profile & Level Indicators," JCTVC-I0231, Vidyo, Joint Collaborative Team on Video Coding (JCT-VC) of ITU-T SG 16 WP 3 and ISO/IEC JTC 1/SC 29/WG 11 9th Meeting: Geneva, CH, Apr. 27-May 7, 2012, 7 pages, XP030111994.

\* cited by examiner

METHOD AND APPARATUS FOR VIDEO CODING USING ADAPTIVE TILE SIZES

CROSS REFERENCE TO RELATED APPLICATIONS

This application claims benefit to U.S. Provisional Application 62/129,297, entitled "METHOD AND APPARATUS FOR VIDEO CODING USING ADAPTIVE TILE SIZES," filed on Mar. 6, 2015, the entirety of which is hereby incorporated by reference herein.

BACKGROUND

Technological Field

This disclosure is related to the field of video coding and compression. In particular, it is related to adaptive tile sizing for High Efficiency Video Coding (HEVC). It is also related to 3D video coding, such as the multiview extension of HEVC, referred to as MV-HEVC. Various embodiments relate to systems and methods for improved inter-layer prediction signaling and related processes (e.g., derivation of inter-layer reference picture sets, derivation of reference picture lists, etc.).

Background

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding processes, such as those described in the standards defined by MPEG-2, MPEG-4, ITU-T H.263, ITU-T H.264/MPEG-4, Part 10, Advanced Video Coding (AVC), the (HEVC standard presently under development, and extensions of such standards. The video devices may transmit, receive, encode, decode, and/or store digital video information more efficiently by implementing such types of video coding.

Video coding methods include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes systems and methods related to video coding. The systems, methods, and devices of this disclosure each have several innovative aspects, no single one of which is solely responsible for the desirable attributes disclosed herein.

One aspect of the disclosure provides a method of encoding video data. The method can include determining a tile size partition for a frame of video data. The method can also include comparing the tile size partition for the frame of video data with a plurality of tile size partitions stored in a database to determine whether the tile size partition for the frame of video data is equivalent to one of the plurality of tile size partitions. Each of the plurality of tile size partitions stored in the database can be associated with a corresponding picture parameter set identifier (PPSID). In response to determining that the tile size partition for the frame of video data is not equivalent to any one of the plurality of tile size partitions stored in the database, the method can also include signaling a picture parameter set (PPS) including the tile size partition for the frame of video data. The method can also include storing the tile size partition for the frame of video data in the database. In response to determining that the tile size partition for the frame of video data is equivalent to one of the plurality of tile size partitions stored in the database, the method can include retrieving the corresponding PPSID associated with the one of the plurality of tile size partitions stored in the database that is equivalent to the tile size partition for the frame of video data. The method can also include signaling the corresponding PPSID in a slice header.

Another aspect of the disclosure provides an apparatus for encoding video data according to the method for encoding video data. The device can have a memory unit having a database. The database can have a plurality of tile size partitions. Each tile size partition of the plurality of tile size partitions can be associated with a corresponding picture parameter set identifier (PPSID). The device can also have at least one processor. The processor can determine a tile size partition for a frame of video data. The processor can also compare the tile size partition for the frame of video data with the plurality of tile size partitions stored in the database to determine whether the tile size partition for the frame of video data is equivalent to one of the plurality of tile size partitions. In response to determining that the tile size partition for the frame of video data is not equivalent to any one of the plurality of tile size partitions stored in the database, the processor can signal a picture parameter set (PPS) including the tile size partition for the frame of video data. The processor can also store the tile size partition for the frame of video data in the database. In response to determining that the tile size partition for the frame of video data is equivalent to one of the plurality of tile size partitions stored in the database, the processor can retrieve the corresponding PPSID associated with the one of the plurality of tile size partitions stored in the database that is equivalent to the tile size partition for the frame of video data. The processor can also signal the corresponding PPSID in a slice header.

Another aspect of the disclosure provides an apparatus for encoding video data. The apparatus can have a storage means configured to store a plurality of tile size partitions, each tile size partition of the plurality of tile size partitions being associated with a corresponding picture parameter set identifier (PPSID). The apparatus can also have a determining means configured to determine a tile size partition for a frame of video data. The apparatus can also have a signaling means configured to transmit a picture parameter set (PPS). The apparatus can also have a comparing means configured to compare the tile size partition for the frame of video data with the plurality of tile size partitions stored by the storage means to determine whether the tile size partition for the frame of video data is equivalent to one of the plurality of tile size partitions. In response to the determining means determining that the tile size partition for the frame of video data is not equivalent to any one of the plurality of tile size partitions stored by the storage means, the signaling means can signal a PPS including the tile size partition for the frame of video data, and the storage means can store the tile size partition for the frame of video data. In response to the determining means determining that the tile size partition for the frame of video data is equivalent to one of the plurality of tile size partitions stored by the storage means, the comparing means can retrieve the corresponding PPSID associated with the one of the plurality of tile size partitions stored by the storage means that is equivalent to the tile size partition for the frame of video data, and the signaling means can signal the corresponding PPSID in a slice header.

Another aspect of the disclosure provides a method of encoding video data. The method can include selecting a first size partition based on a computation complexity of a first frame of video data. The method can also include signaling in syntax information a picture parameter set (PPS) indicating the first tile size partition for the frame of video data. The method can also include storing the first tile size partition in a database, the database configured to store a plurality of tile size partitions, each tile size partition of the plurality of tile size partitions being associated with a corresponding PPS identifier (PPSID). The method can also include determining a second tile size partition for a second frame of video data. In response to determining that the second tile size partition is the same as the first tile size partition, the method can also include retrieving the first tile size partition from the database. The method can also include signaling the PPSID associated with the first tile size partition in a slice header. In response to determining that the second tile size partition differs from the plurality of tile size partitions stored in the database, the method can also include signaling in syntax information a second PPS indicating the second tile size partition for the second frame of video data. The method can also include storing the second tile size partition in the database.

Other features and advantages of the present disclosure should be apparent from the following description which illustrates, by way of example, aspects of the disclosure.

DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
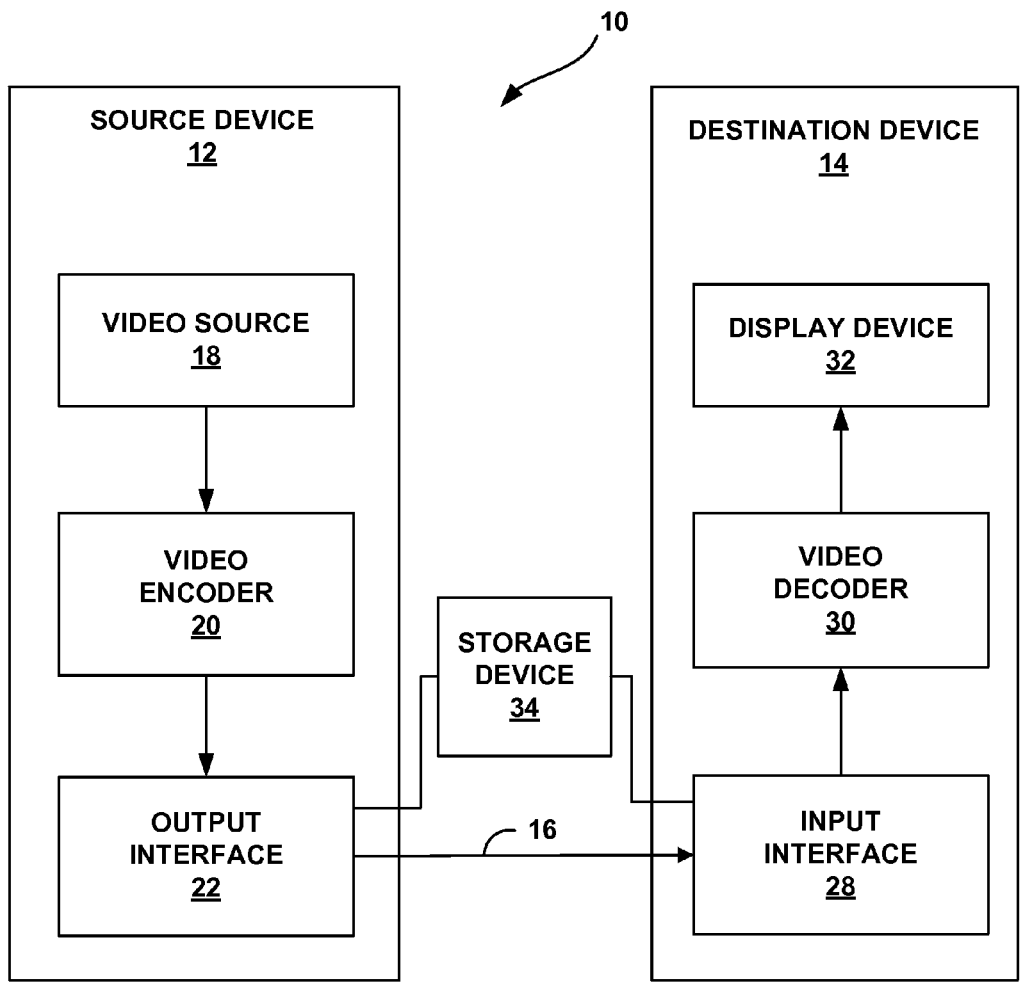
FIG. 1 is a functional block diagram of a video coding system.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that the disclosure without these specific details. In some instances, well-known structures and components are shown in simplified form for brevity of description.

Video Coding

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. One or more of the foregoing standards may be used with the embodiments described herein.

In addition, a new video coding standard, namely High Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as "HEVC WD" hereinafter, is available from phenix.int-evry.fr/jct/doc_end_user/documents/15_Geneva/wg11/JCTVC-O1003-v1.zip. The multi-view extension to HEVC, namely MV-HEVC, and another HEVC extension for more advanced 3D video coding (3D-HEVC) are being developed by the JCT-3V, and meanwhile, the scalable video coding extension to HEVC, namely SHVC, is being developed by the JCT-VC. A recent Working Draft (WD) of MV-HEVC, referred to as MV-HEVC WD5 hereinafter, is available from phenix.it-sudparis.eu/jct2/doc_end_user/documents/6_Geneva/wg11/JCT3V-F1004-v6.zip. The latest WD of 3D-HEVC, referred to as 3D-HEVC WD1 hereinafter, is available from phenix.it-sudparis.eu/jct2/doc_end_user/documents/6_Geneva/wg11/JCT3V-F1001-v3.zip. A recent Working Draft (WD) of SHVC and referred to as SHVC WD3 hereinafter, is available from phenix.it-sudparis.eu/jct/doc_end_user/documents/15_Geneva/wg11/JCTVC-O1008-v3.zip.

HEVC can generally reduce bitrate requirements by half with comparable image quality, at the expense of increased computational complexity. In some embodiments, HEVC encoders can trade off computational complexity, compression rate, robustness to errors, and encoding delay time.

Accordingly, HEVC can generally support higher resolution video and improved parallel processing methods.

The HEVC video coding layer uses a "hybrid" approach, implementing inter-picture and intra-picture prediction and two dimensional (2D) transform coding. An HEVC encoder can first split a picture into block shaped regions for the first picture, or the first picture of a random access point, which uses intra-picture prediction. Intra-picture prediction as used herein can generally refer to the prediction of the blocks in the picture based only on the information in that picture. For all other pictures, inter-picture prediction is used. Inter-picture prediction can generally refer to when prediction information is used from other pictures to generate the current picture. After the prediction methods are finished and the picture goes through the loop filters, the final picture representation is stored in the decoded picture buffer. Pictures stored in the decoded picture buffer can be used for the prediction of other pictures.

HEVC can also implement several parallel processing tools. In some embodiments, tiles can be used to divide a picture into a grid of rectangular regions that can independently be encoded and decoded.

The HEVC standard employs the parameter set concept. The sequence parameter set (SPS), picture parameter set (PPS), and video parameter set (VPS) mechanism in HEVC may decouple the transmission of infrequently changing information from the transmission of coded video block data.

In HEVC, an identifier of SPS picture, PPS, or VPS is coded using the variable-length coding method named 'ue (v)'. The HEVC working draft defines 'ue(v)' coded syntax elements as unsigned integer Exp-Golomb-coded syntax elements with the left bit first. Each SPS includes an SPS identifier (ID), each PPS includes a PPSID and an SPSID, and each slice header includes a PPSID. Each buffering period supplemental enhancement information (SEI) message also includes an SPSID. In general, a video coding device or a video processing device may encapsulate data of a bitstream within network abstraction layer (NAL) units. NAL units include video coding layer (VCL) NAL units and non-VCL NAL units. VCL NAL units generally include information used by a video coder, such as coded video data and parameter sets, e.g., SPSs, PPSs, and VPSs. Non-VCL NAL units include information defining SEI messages, which may contain information that is not necessary for decoding the coded pictures samples from VCL NAL units, but may assist in processes related to decoding, display, error resilience, and other purposes.

Video Coding System

FIG. 1 is a functional block diagram of a video coding system. A video coding system ("system") 10 that may utilize methods in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, system 10 includes a source device 12 that can generate encoded video data to be decoded at a later time by a destination device 14. The source device 12 and the destination device 14 can comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

The destination device 14 may receive the encoded video data to be decoded via a link 16. The link 16 may comprise any type of medium or device capable of moving the encoded video data from the source device 12 to the destination device 14. In one example, the link 16 may comprise a communication medium to enable source device 12 to transmit encoded video data directly to the destination device 14 in real-time. The source device 12 may modulate the encoded video data according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Encoded data may be output from the output interface 22 to a storage device 34. Similarly, encoded data may be accessed from the storage device 34 by the input interface 28. The storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device 34 may correspond to a file server or another intermediate storage device that may hold the encoded video generated by the source device 12. The destination device 14 may access stored video data from the storage device 34 via streaming or download. The file server may be any type of server capable of storing encoded video data and transmitting that encoded video data to the destination device 14. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device 34 may be a streaming transmission, a download transmission, or a combination of both.

The methods of this disclosure are not necessarily limited to wireless applications or settings. The methods may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, the system 10 can be configured to support one-way or two-way video transmission to support applications such as video streaming, video playback, video broadcasting, and/or video telephony.

In the example of FIG. 1, the source device 12 includes a video source 18, video encoder 20, and an output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, the source device 12 and destination the device 14 may form so-called camera phones or video phones. However, the methods described in this disclosure may be applicable to video coding in general, and may be applied to wireless and/or wired applications.

The video encoder 20 may encode the captured, pre-captured, or computer-generated video. Additionally, in some embodiments, the video decoder 30 may differentiate between the first bitstream and the second bitstream based on the parameter set ID of the first bitstream and the unique parameter set ID. The encoder 20 can further maintain a database of the parameter set IDs, in for example the storage device 34. The encoder can reference the parameter set ID database and signal the parameter set ID instead of sending an entirely new parameter set for certain elements of the video data stream that remain constant. For example, the encoder 20 can maintain a listing of parameter set IDs for particular coding parameters, for example, various tile size partitions of the stream of video data. The encoder 20 can then reference the parameter set ID to indicate a relevant tile size partition for the decoder 30. This can provide certain bit rate savings in certain embodiments by reducing the number of parameter sets that are sent. This is described in more detail below in connection with FIG. 4.

In other examples, the output interface 22 of the source device 12 may transmit the encoded video, including the parameter set and the parameter set IDs, data directly to the destination device 14 via the link 16. The encoded video data may also (or alternatively) be stored onto the storage device 34 for later access by the destination device 14 or other devices, for decoding and/or playback.

The destination device 14 includes an input interface 28, a video decoder 30, and a display device 32. In some cases, the input interface 28 may include a receiver and/or a modem. The input interface 28 of the destination device 14 receives the encoded video data over the link 16. The encoded video data communicated over the link 16, or provided on the storage device 34, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the methods are implemented partially in software, a device may store instructions for the software in a suitable, non-transitory computer-readable medium and execute the instructions in hardware using one or more processors to perform the methods of this disclosure. Each of the video encoder 20 and the video decoder 30 may be included in one or more encoders or decoders, either of which can be integrated as part of a combined encoder/decoder (CODEC) in a respective device.

Figure 2:
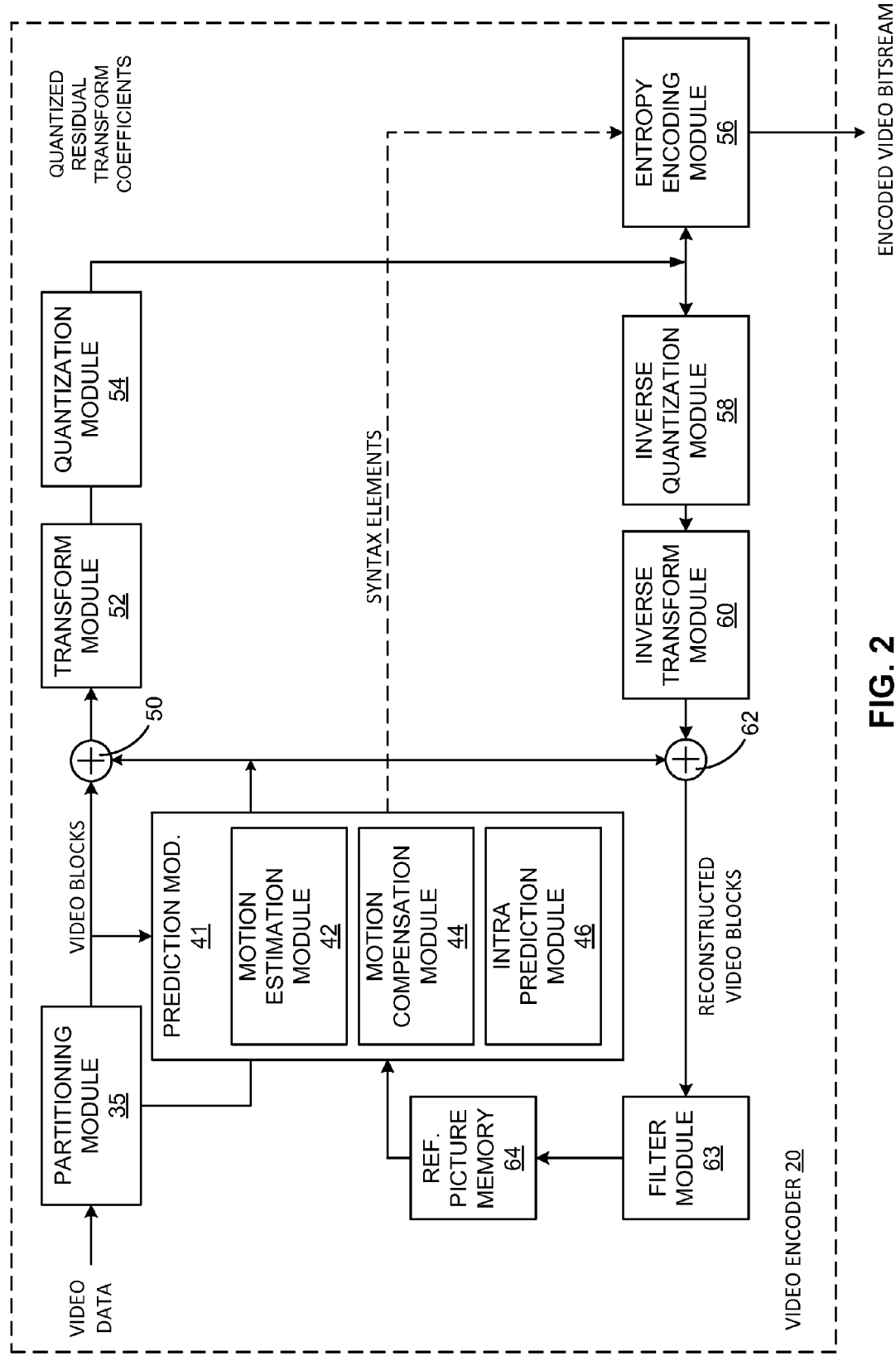
FIG. 2 is a functional block diagram of the video encoder of FIG. 1.

FIG. 2 is a functional block diagram of the video encoder of FIG. 1. The video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In some examples, within the context of a bitstream, parameter set IDs may be uniquely assigned, unless the intention is to overwrite a previously transmitted parameter set. In addition, the video encoder 20 may be configured to encode two bitstreams including data representative of the same content, but formatted differently (e.g., a base profile and a high profile of HEVC, one 720p version and one 1080p version, or the like). Likewise, when encoding two different sets of media content, the video encoder 20 may reuse parameter set IDs, because two different media streams resulting from such media content do not conflict (in other words, the video encoder 20 may "reset" a parameter set ID counter when beginning to encode a different set of media content). In some examples, it is possible to let the two bitstreams share the same parameter set ID value space—i.e. not to reuse parameter set IDs.

In the example of FIG. 2, the video encoder 20 includes a partitioning module 35, prediction module 41, filter module 63, reference picture memory 64, summer 50, transform module 52, quantization module 54, and entropy encoding module 56. The prediction module 41 includes a motion estimation module 42, a motion compensation module 44, and an intra-prediction module 46. For video block reconstruction, the video encoder 20 also includes inverse quantization module 58, inverse transform module 60, and summer 62. Filter module 63 is intended to represent one or more loop filters such as a deblocking filter, an adaptive loop filter (ALF), and a sample adaptive offset (SAO) filter. Although filter module 63 is shown in FIG. 2 as being an in loop filter, in other configurations, filter module 63 may be implemented as a post loop filter.

The video encoder 20 can receive video data, and partitioning module 35 can partition the data into video blocks. This partitioning may also include partitioning into slices, tiles, or other larger units, as wells as video block partitioning, e.g., according to a quadtree structure of LCUs and CUs. The video encoder 20 generally illustrates the components that encode video blocks within a video slice to be encoded. The video encoder 20 may divide the slice into multiple video blocks (and possibly into sets of video blocks referred to as tiles). The prediction module 41 may select one of a plurality of possible coding modes, such as one of a plurality of intra coding modes or one of a plurality of inter coding modes, for the current video block based on error results (e.g., coding rate and the level of distortion). The prediction module 41 may provide the resulting intra- or inter-coded block to the summer 50 to generate residual block data and to the summer 62 to reconstruct the encoded block for use as a reference picture.

The intra-prediction module 46 within the prediction module 41 may perform intra-predictive coding of the current video block relative to one or more neighboring blocks in the same frame or slice as the current block to be coded to provide spatial compression. The motion estimation module 42 and the motion compensation module 44 within the prediction module 41 perform inter-predictive coding of the current video block relative to one or more predictive blocks in one or more reference pictures to provide temporal compression.

The motion estimation module 42 may be configured to determine the inter-prediction mode for a video slice according to a predetermined pattern for a video sequence. The predetermined pattern may designate video slices in the sequence as P slices, B slices or GPB slices. The motion estimation module 42 and the motion compensation module 44 may be highly integrated, but are illustrated separately for conceptual purposes. Motion estimation, performed by the motion estimation module 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the video encoder 20 may calculate values for sub-integer pixel positions of reference pictures stored in the reference picture memory 64. For example, the video encoder 20 may interpolate values of one-quarter pixel positions, one-eighth pixel positions, or other fractional pixel positions of the reference picture. Therefore, the motion estimation module 42 may perform a motion search relative to the full pixel positions and fractional pixel positions and output a motion vector with fractional pixel precision.

The motion estimation module 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in the reference picture memory 64. The motion estimation module 42 sends the calculated motion vector to the entropy encoding module 56 and the motion compensation module 44.

Motion compensation, performed by the motion compensation module 44, may involve fetching or generating the predictive block based on the motion vector determined by motion estimation, possibly performing interpolations to sub-pixel precision. Upon receiving the motion vector for the PU of the current video block, motion compensation module 44 may locate the predictive block to which the motion vector points in one of the reference picture lists. The video encoder 20 forms a residual video block by subtracting pixel values of the predictive block from the pixel values of the current video block being coded, forming pixel difference values. The pixel difference values form residual data for the block, and may include both luma and chroma difference components. The summer 50 represents the component or components that perform this subtraction operation. The motion compensation module 44 may also generate syntax elements associated with the video blocks and the video slice for use by the video decoder 30 in decoding the video blocks of the video slice.

The intra-prediction module 46 can intra-predict a current block, as an alternative to the inter-prediction performed by the motion estimation module 42 and the motion compensation module 44, as described above. In particular, intra-prediction module 46 may determine an intra-prediction mode to use to encode a current block. In some examples, the intra-prediction module 46 may encode a current block using various intra-prediction modes, e.g., during separate encoding passes. For example, the intra-prediction module 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. The intra-prediction module 46 may calculate ratios from the distortions and rates for the various encoded blocks to determine which intra-prediction mode exhibits the best rate-distortion value for the block.

In any case, after selecting an intra-prediction mode for a block, the intra-prediction module 46 may provide information indicative of the selected intra-prediction mode for the block to the entropy encoding module 56. Entropy encoding module 56 may encode the information indicating the selected intra-prediction mode in accordance with the methods of this disclosure. The video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After the prediction module 41 generates the predictive block for the current video block via either inter-prediction or intra-prediction, the video encoder 20 forms a residual video block by subtracting the predictive block from the current video block. The residual video data in the residual block may be included in one or more TUs and applied to the transform module 52. The transform module 52 transforms the residual video data into residual transform coefficients using a transform, such as a discrete cosine transform (DCT) or a conceptually similar transform. The transform module 52 may convert the residual video data from a pixel domain to a transform domain, such as a frequency domain.

The transform module 52 may send the resulting transform coefficients to the quantization module 54. The quantization module 54 quantizes the transform coefficients to further reduce bit rate. The quantization process may reduce the bit depth associated with some or all of the coefficients. The degree of quantization may be modified by adjusting a quantization parameter. In some examples, the quantization module 54 may then perform a scan of the matrix including the quantized transform coefficients. Alternatively, the entropy encoding module 56 may perform the scan.

Following quantization, the entropy encoding module 56 entropy encodes the quantized transform coefficients. For example, the entropy encoding module 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or method. Following the entropy encoding by the entropy encoding module 56, the encoded bitstream may be transmitted to the video decoder 30, or archived for later transmission or retrieval by the video decoder 30. The entropy encoding module 56 may also entropy encode the motion vectors and the other syntax elements for the current video slice being coded.

The inverse quantization module 58 and the inverse transform module 60 apply inverse quantization and inverse transformation, respectively, to reconstruct the residual block in the pixel domain for later use as a reference block of a reference picture. The motion compensation module 44 may calculate a reference block by adding the residual block to a predictive block of one of the reference pictures within one of the reference picture lists. The motion compensation module 44 may also apply one or more interpolation filters to the reconstructed residual block to calculate sub-integer pixel values for use in motion estimation. The summer 62 adds the reconstructed residual block to the motion compensated prediction block produced by the motion compensation module 44 to produce a reference block for storage in the reference picture memory 64. The reference block may be used by the motion estimation module 42 and the motion compensation module 44 as a reference block to inter-predict a block in a subsequent video frame or picture.

In this manner, the video encoder 20 of FIG. 2 represents an example of a video encoder configured to encode parameter set IDs coded according to the methods of this disclosure.

In an example method of encoding video data, the video encoder 20 may receive a new parameter set (e.g., SPS, PPS, VPS) associated with a unique parameter set ID, wherein a device transmitting the new parameter set associated with the unique parameter set ID has (1) determined if a parameter set ID of a first parameter set of a first bitstream is the same as a parameter set ID of a first parameter set of a second bitstream, (2) in response to the parameter set ID of the second bitstream matching the parameter set ID of the first bitstream, changing the parameter set ID of the second bitstream to a unique parameter set ID, and (3) transmitting the new parameter set associated with the unique parameter set ID. The video encoder 20 may also differentiate between the first bitstream and the second bitstream based on the parameter set ID of the first bitstream and the unique parameter set ID.

Figure 3:
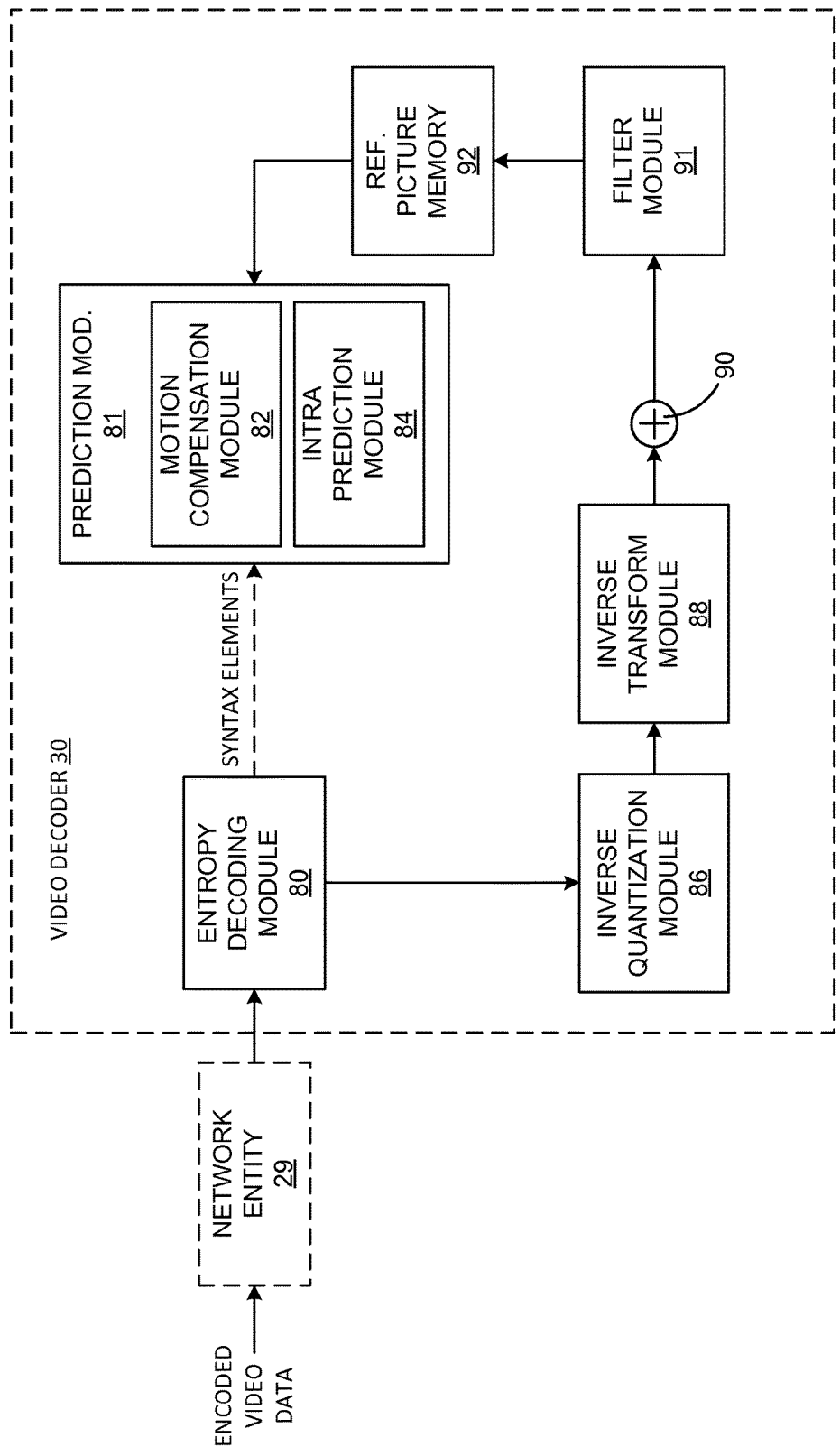
FIG. 3 is a functional block diagram of the video decoder of FIG. 1.

FIG. 3 is a functional block diagram of the video decoder of FIG. 1. In an embodiment, if the video decoder 30 receives a parameter set having the same parameter set ID of a previously received parameter set, the video decoder 30 may be configured to overwrite the previous parameter set with the new parameter set. Thus, the video decoder 30 may decode video data referring to the parameter set ID preceding the new parameter set (in decoding order) using the previous parameter set having that ID, but decode video data referring to the parameter set ID following the new parameter set (in decoding order) using the new parameter set. In accordance with the methods of this disclosure, the video decoder 30 can also receive the parameter set ID referencing previously used parameters, such as for example, a previously used tile size partition. The encoder 20 can signal a parameter set ID indicating the use of a previous parameter set, instead of sending an entirely new parameter set.

The video decoder 30 can include an entropy decoding module 80, a prediction module 81, an inverse quantization module 86, an inverse transformation module 88, a summer 90, a filter module 91, and a reference picture memory 92. The prediction module 81 includes a motion compensation module 82 and an intra-prediction module 84. The video decoder 30 may, in some examples, perform a decoding pass generally reciprocal to the encoding pass described with respect to video encoder 20 from FIG. 2.

During the decoding process, the video decoder 30 receives an encoded video bitstream that represents video blocks of an encoded video slice and associated syntax elements from the video encoder 20. The video decoder 30 may receive the encoded video bitstream from a network entity 29. The network entity 29 may, for example, be a server, a video editor/splicer, or other such device configured to implement one or more of the methods described above. As described above, some of the methods described in this disclosure may be implemented by the network entity 29 prior to the network entity 29 transmitting the encoded video bitstream to video decoder 30. In some video decoding systems, the network entity 29 and the video decoder 30 may be parts of separate devices, while in other instances, the functionality described with respect to the network entity 29 may be performed by the same device that comprises the video decoder 30.

The entropy decoding module 80 of the video decoder 30 entropy decodes the bitstream to generate quantized coefficients, motion vectors, and other syntax elements. The entropy decoding module 80 forwards the motion vectors and other syntax elements to the prediction module 81. The video decoder 30 may receive the syntax elements at the video slice level and/or the video block level.

When the video slice is coded as an intra-coded (I) slice, the intra-prediction module 84 of the prediction module 81 may generate prediction data for a video block of the current video slice based on a signaled intra prediction mode and data from previously decoded blocks of the current frame or picture. When the video frame is coded as an inter-coded (i.e., B, P or GPB) slice, the motion compensation module 82 of the prediction module 81 produces predictive blocks for a video block of the current video slice based on the motion vectors and other syntax elements received from the entropy decoding module 80. The predictive blocks may be produced from one of the reference pictures within one of the reference picture lists. The video decoder 30 may construct the reference frame lists, List 0 and List 1, using default construction methods based on reference pictures stored in the reference picture memory 92.

The motion compensation module 82 determines prediction information for a video block of the current video slice by parsing the motion vectors and other syntax elements, and uses the prediction information to produce the predictive blocks for the current video block being decoded. For example, the motion compensation module 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

The motion compensation module 82 may also perform interpolation based on interpolation filters. The motion compensation module 82 may use interpolation filters as used by the video encoder 20 during encoding of the video blocks to calculate interpolated values for sub-integer pixels of reference blocks. In this case, the motion compensation module 82 may determine the interpolation filters used by the video encoder 20 from the received syntax elements and use the interpolation filters to produce predictive blocks.

The inverse quantization module 86 inverse quantizes, i.e., de-quantizes, the quantized transform coefficients provided in the bitstream and decoded by entropy decoding module 80. The inverse quantization process may include use of a quantization parameter calculated by video encoder 20 for each video block in the video slice to determine a degree of quantization and, likewise, a degree of inverse quantization that should be applied. Inverse transform module 88 applies an inverse transform, e.g., an inverse DCT, an inverse integer transform, or a conceptually similar inverse transform process, to the transform coefficients in order to produce residual blocks in the pixel domain.

After motion compensation module 82 generates the predictive block for the current video block based on the motion vectors and other syntax elements, video decoder 30 forms a decoded video block by summing the residual blocks from inverse transform module 88 with the corresponding predictive blocks generated by motion compensation module 82. Summer 90 represents the component or components that perform this summation operation. If desired, loop filters (either in the coding loop or after the coding loop) may also be used to smooth pixel transitions, or otherwise improve the video quality. Filter module 91 is intended to represent one or more loop filters such as a deblocking filter, an adaptive loop filter (ALF), and a sample adaptive offset (SAO) filter. Although the filter module 91 is shown in FIG. 3 as being an in loop filter, in other configurations, the filter module 91 may be implemented as a post loop filter. The decoded video blocks in a given frame or picture are then stored in the reference picture memory 92, which stores reference pictures used for subsequent motion compensation. The reference picture memory 92 also stores decoded video for later presentation on a display device, such as the display device 32 of FIG. 3.

In this manner, the video decoder 30 of FIG. 3 represents an example of a video decoder configured to decode parameter set IDs coded according to the methods of this disclosure.

Figure 4A:
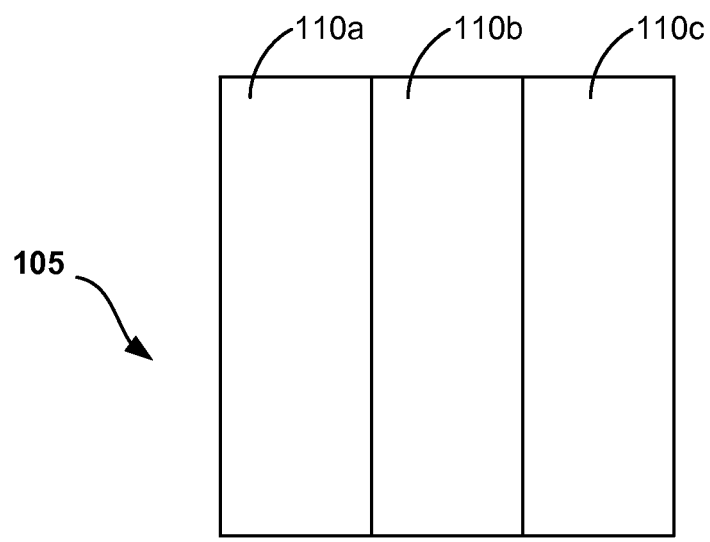
FIG. 4A is a graphical representation of an embodiment of symmetrical video frame tile partition.
Figure 4B:
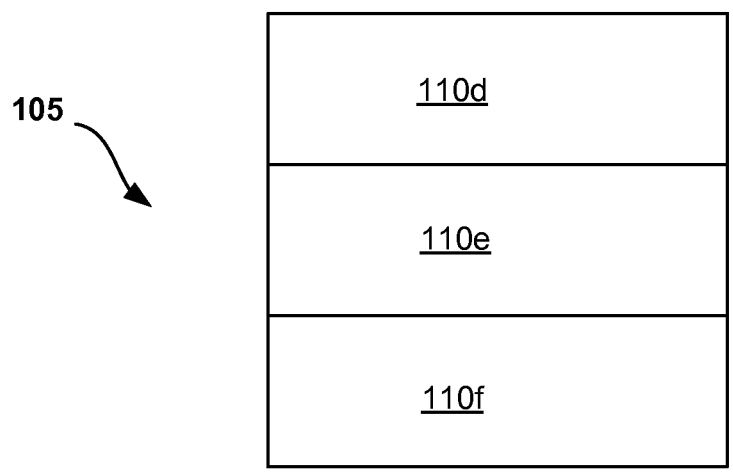
FIG. 4B is a graphical representation of another embodiment of symmetrical video frame tile partition.
Figure 4C:
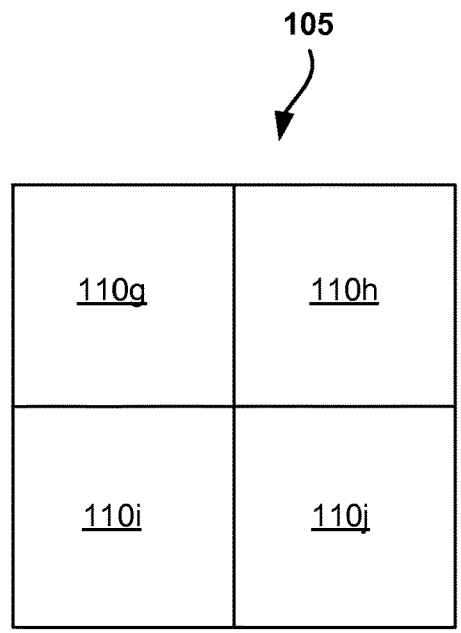
FIG. 4C is a graphical representation of another embodiment of symmetrical video frame tile partition.

FIG. 4A-FIG. 4C are graphical representations of three possible tile partitions which can be implemented by the encoder 20. As noted above, in HEVC the encoder 20 can partition the video data into a plurality of tiles 110. More particularly, the partitioning module 35 can partition a video frame 105 into a plurality of tiles 110. The tiles 110 may be labeled and described individually for clarity with respect to their partitions; however they may be referred to collectively herein as tiles 110.

FIG. 4A is a graphical representation of an embodiment of symmetrical video frame tile partition. A video frame 105 can be partitioned along a horizontal direction into three equal tiles 110*a*, 110*b*, 110*c*. Each of the tiles 110*a*-110*c* can be encoded independently and separately. In some embodiments, the tiles 110*a*-110*c* can be encoded simultaneously.

FIG. 4B is a graphical representation of another embodiment of symmetrical video frame tile partition. As shown, the video frame 105 can be partitioned along a vertical direction into three tiles 110*d*, 110*e*, 110*f*.

FIG. 4C is a graphical representation of another embodiment of symmetrical video frame tile partition. The video frame 105 can be partitioned both horizontally and vertically into four equal tiles 110*g*, 110*h*, 110*i*, 110*j*. As above, the each of the tiles 110*g*-110*j* can be encoded separately and independently.

According to HEVC, the video frame 105 can be partitioned into generally uniform size tiles as shown. In some embodiments, the tiles 110 can have small variations in size, stemming from rounding errors that can occur in the last tile 110 encoded as calculations proceed along horizontal or vertical direction. The tile size partitions can be signaled to the decoder 30 via the parameter set, as described above. In particular, the slice header may contain certain parameter set IDs (e.g., a PPSID) associated with the tile size partition information.

Figure 5:
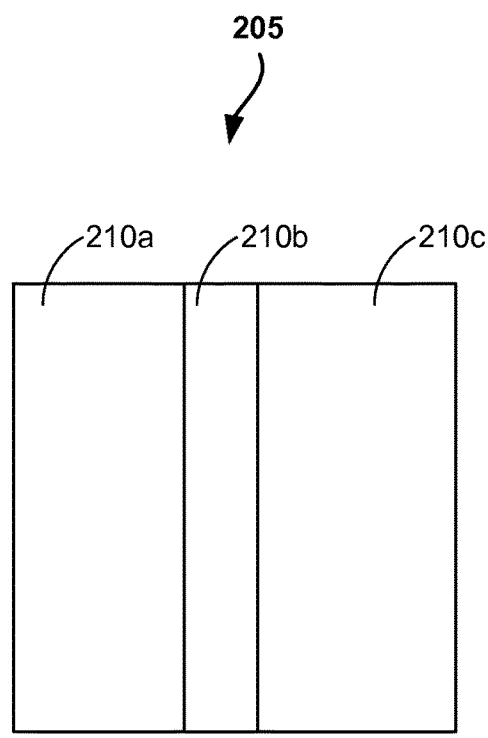
FIG. 5 is a graphical representation of a video frame having non-uniform tile partitions.

FIG. 5 is a graphical representation of a video frame having non-uniform tile partitions which can be implemented by the encoder 20. A video frame 205 has three non-uniform tiles 210*a*, 210*b*, 210*c* (collectively referred to hereinafter as tiles 210). In some embodiments, such non-uniform or asymmetrically sized tiles 210 can be used to parallelize video encoding. While the tiles 210 are shown partitioned along a horizontal direction across the video frame 205, this should not be considered limiting. The tiles 210 can also be vertically, horizontally, or both horizontally and vertically partitioned as shown in FIG. 4A-FIG. 4C. Furthermore, the video frame 205 can also be partitioned by the encoder 20 into more or fewer than the three tiles 210 shown.

In general, computation complexity of encoded video is not constant across the video frame 205. In some embodiments, video content, such as motion or static images in a given video frame 205, can lead to non-uniform video complexity. For example, areas within the video frame 205 with complex motion or obvious luminance level changes or variations may incur higher encoding complexity than static areas. As a result, non-uniform size tile 210 partition may often be needed in order to achieve better parallelization of computation complexity from one tile 210 to the next.

As shown, the tile 210*b* of the video frame 205 is a narrower than the tile 210*a* and the tile 210*c*. The narrow tile 210*b* may be indicative of a partition of the video frame 205 having increased computation complexity. In an embodiment, the video frame 205 can be centered on a moving subject such that the moving subject is in the tile 210*b* (e.g., a video teleconference with increased motion at the center of the video frame 205). Accordingly, more computation may be required to encode the video content of the tile 210*b*. If the remainder of the video frame 205 (e.g., the tiles 210*a*, 210*c*) is static or contains less motion as in a background, there can be lower computation complexity in the surrounding tiles 210*a*, 210*c*. Thus, the partitions can be made based on computation complexity as opposed to area. If distributed equally, the three tiles 210 can be encoded with more balanced computation distribution than the uniform tile partition shown in FIG. 4A-FIG. 4C. Thus, in order to balance the computation complexity across the video frame 205, the encoder 20 can adjust the tile size partitions to parallelize the computation required at the encoder 20.

In some embodiments, more balanced computation distribution can result in better parallelization and increased encoding speed. In practice, the encoder 20 can adaptively determine the size of the tiles illustrated in FIG. 4A-FIG. 4C and FIG. 5 based on previously coded video frames 105, 205. As long as there is no dramatic scene change, neighboring video frames 205 (e.g., the preceding or succeeding video frames 205) can commonly share similar encoding complexity distribution. Accordingly, the complexity distribution of a previously coded video frame 205 can be used to determine the proper tile 210 partition of the "current" video frame 205 being coded.

In some embodiments, using non-uniform partition sizes that are adaptive to video encoding complexity can provide in excess of 40 percent improvement in parallelization, relative to using uniform partition sizes (e.g., FIG. 4A-FIG. 4C).

Figure 6:
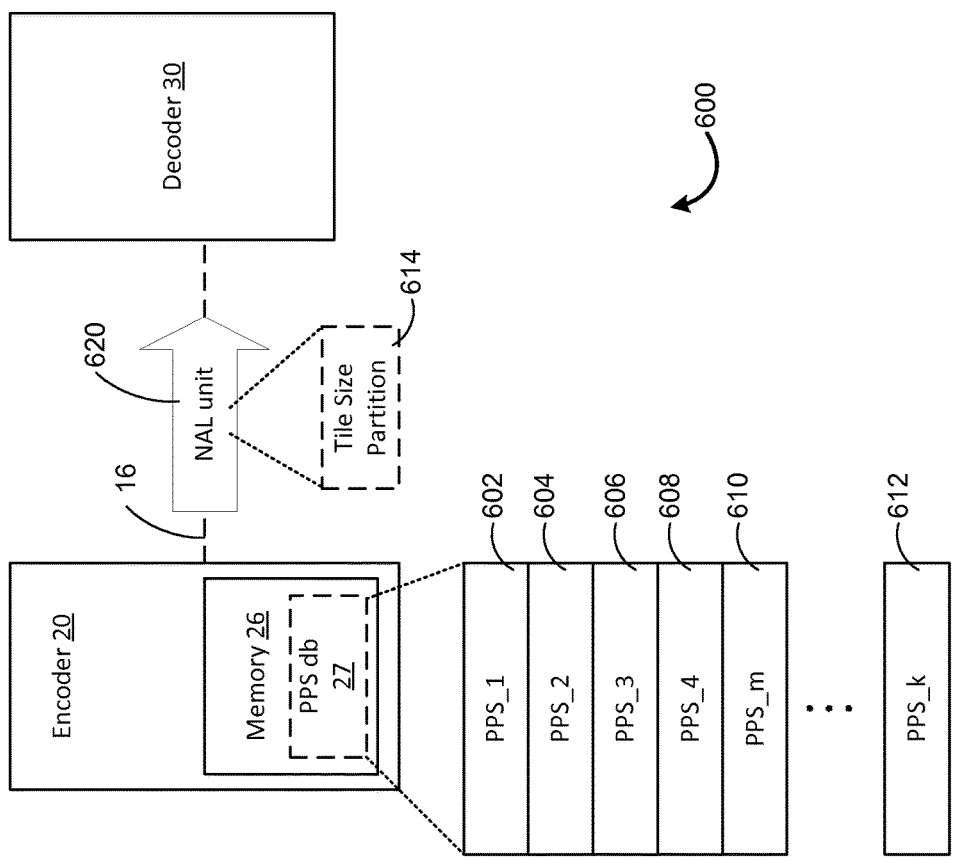
FIG. 6 is a block diagram that illustrates an example video coding system.

FIG. 6 is a block diagram that illustrates an example video coding system. A video coding system ("system") 600 is shown having the encoder 20 and the decoder 30. The system 600 may be the same or similar to the system 10 of FIG. 1. The encoder 20 can be configured to generate and transmit NAL units 620 identifying a tile size partition 614. The NAL unit 620 can contain parameter sets (e.g., PPS, VPS, SPS) each having a parameter set ID. For example, a tile size partition 614 can be identified by a PPS. The PPS can also have a parameter set ID generally referred to herein as a PPSID. In some embodiments, the PPSID can be signaled in a slice header.

In some embodiments, variable tile size partitions can be supported by the system at the frame level. Accordingly, a convenient way to signal variable tile size partitions to the decoder 30 is to send the variable tile size partition 614 information in a new PPS for each video frame 205. The new PPS can then indicate a particular tile size partition 614 for the video frame 205 with which it is associated. However, the transmission of a new PPS for every video frame 205 can dramatically increase overhead and bitrate, especially for low bitrate applications.

In some embodiments, the encoder 20 can further have a storage device or memory 26. The memory 26 can be the same or similar to the storage device 34 of FIG. 1. The encoder 20 can maintain a PPS database ("PPS db") 27 within the memory 26. The PPS db 27 can be configured to store previously signaled PPS identifiers ("PPSID") with their associated tile partition sizes (e.g., the tile size partition 614). As noted above, the NAL units 620 can contain PPSs containing information relevant to the decoding of one or more individual pictures or video frames 205 within a coded video sequence.

As shown, the PPS db 27 can be configured to store a number of PPSIDs: PPS_1 602-PPS_k 612. The PPSIDs, PPS_1 602-PPS_k 612 can be those PPSIDs that were previously transmitted to the decoder 30. Thus the PPS db 27 can be used to store commonly used or recently used PPSIDs and associated tile size partitions 614. For a given video frame 205, if a desired tile size partition 614 is the same as that in a previously signaled PPS, then there may be no need to signal a new PPS, the encoder 20 can reference a desired PPSID from the PPS db 27. For example, if the encoder 20 sends a NAL unit 620 having tile size partition equivalent to a previously sent PPS_2 604, then the encoder 20 need only reference the PPS_2 604 indicating the tile size partition 614. Accordingly, in some embodiments, the encoder 20 can reuse the PPS_2 604 in the NAL unit 620 because it can have the same tile size partition 614. In some embodiments, the encoder 20 can signal to the decoder 30 in a slice header that the PPS_2 604 is used for coding the current slice.

In some embodiments, the PPS db 27 has limited capacity to store PPSIDs. Accordingly, certain methods may be required to manage the stored PPSIDs. For example, up to k-number of PPSIDs can be stored in the PPS db 27. This can correspond to the PPS_k 612 as shown. This can also correspond to k-number of tile partition sizes 614 stored to the memory 26.

In some embodiments, the PPS db 27 can be managed by assigning a weighting factor to each PPSID and its associated tile size partition within the PPS db 27. For example, if the encoder 20 determines the current video frame 205 should have a tile size partition 614 that is not currently in the PPS db 27, a new PPS is signaled to the decoder 30 indicating the new tile size partition 614. The encoder 20 can then save the new tile size partition 614 to the PPS db 27 after the video frame 205 is coded. In some embodiments, the new tile size partition 614 can be associated with a PPSID in the PPS db 27.

When the PPS db 27 is full and the new tile size partition 614 is not already present in the PPS db 27, one of the existing PPSIDs (e.g., the PPS_3 606) can be identified and replaced or overwritten by associating it with the new tile size partition 614. In some embodiments the identification of the PPSID to be replaced can be based on a weighting factor associated with each PPSID record in the PPS db 27.

In some embodiments, the weighting factors can be managed through two steps: reset and attenuation. "Reset" can be used to set or reset a weighting factor value for a new tile size partition 614 or PPSID inserted in the PPS db 27. Reset can also be implemented to set a weighting factor for an old (e.g., previously used or existing) PPSID in the PPS db 27 that is associated with the tile size partition 614 being reused by the current video frame 205. "Attenuation" can be used to adjust weighting factors to reflect the length of time that the PPSID or the tile size partition 614 has remained in the PPS db 27 since it was referred or last used.

Various methods can be used to "reset" a weighting factor. In one embodiment, when a new PPS_m 610 is inserted or an existing PPS record (e.g., the PPS_1 602) in the PPS db 27 is reused by the current video frame 205, its weighting factor can be assigned a maximum value to reflect that the current tile size partition 614 identified in the PPS has just been used. Together with "attenuation" step, the value of a weighting factor can indicate when a PPSID is used. The more recently a PPSID is used, the larger a weighting factor it can have. In the event a PPSID record is to be replaced, the PPSID having the smallest weighting factor can be selected for replacement. Accordingly, the PPSID remaining in the PPS db 27 for the longest period of time without being referred may likely be replaced with a new tile size partition 614. In some embodiments, a new PPSID, for example, the PPS_m 610 can be added to the PPS db 27 associated with the new tile size partition 614.

In another embodiment, when an old (or existing) PPSID record in the PPS db 27 corresponding to the tile size partition 614 is re-used by the current video frame 205, or a new PPSID is inserted, its weighting factor can be increased by a certain value, e.g. X, where X>0. For a new PPSID added to the PPS db 27, a weighting factor of X can be assigned. For an old or existing PPSID record in the PPS db 27, if its initial weighting factor is two (2), for example, the weighting factor will be updated as "X+2" following the operation.

In some embodiments the "attenuation" of a weighting factor can further indicate one of two aspects: (a) when a PPSID is used; (b) how often the PPS is referred or reused. The more recently a PPSID is used and/or the more often a PPS is referred, the larger the weighting factor assigned to the given PPSID. In the event a PPSID record is to be replaced, the PPSID having the smallest weighting factor can be selected and its associated record replaced with a new tile size partition (e.g., the PPS_m 610). In some embodiments, the PPSID remains the same. This way, the PPSID records remaining in the PPS db 27 the longest with the least use can mostly likely be replaced in favor of more commonly used PPSIDs and their associated tile size partitions.

In some embodiments, various methods can also be used in the "attenuation" step to adjust weighting factors. In an embodiment, each weighting factor in the PPS db 27 can be simply decremented by a value, for example one (1). Such attenuation of weighting factors can be performed following encoding of a number of video frames 205. For example, it may be performed after coding every frame, or after coding every 10 frames, etc.

In another embodiment, each weighting factor may be scaled down by a predetermined or variable ratio. For example, if such a ratio is two, the operation can be expressed as: w=(w>>1)

Where "w" is the weighting factor. The term ">>" is generally referred to herein as the right-shift operation. Again, such attenuation of weighting factors is performed every time after coding a number of frames. For example, it may be performed after coding every 10 frame, or after coding every 30 frames, etc.

It should be mentioned that the examples above are just for illustration purpose and other operations may be used in weighting factor adjustment to achieve the same effect.

Using the solution described above with a database size of 10, the PPS signaling overhead can be efficiently reduced to under 0.5%, even for low bitrate cases.

In some embodiments, the PPS may be used where certain temporal layers are involved. Temporal layers can be used in video coding to provide temporal scalability and/or more robust video communication, as in HEVC, scalable video coding (SVC) or Scalable HEVC (SHVC). In some embodiments, to achieve temporal scalability, for a given frame at a certain temporal layer, for example, a layer k, the reference frame cannot be any frame at a temporal layer higher than the current layer k. Accordingly, the decoding of video frames at a given temporal level (e.g., a layer 3) may only be dependent on the video frames at the same or lower temporal levels such as the layer 1 or the layer 2 or the layer 3. However the inverse is not true: layer 2 cannot depend on layer 3. Temporal layer 0 is commonly referred to as the base layer (BL) whose decoding is not dependent on any other temporal layers. Thus when decoding base layer video frames 205, the decoder 30 can discard or otherwise refrain from decoding frames at the temporal layer 1 or higher, depending on application requirement and bitstream availability.

Therefore, to address the use of temporal layers in relation to the PPS db 27, weighting factor management can be adjusted. Thus when temporal layers are in use for video coding, only a PPS signaled at a base layer (layer 0) is eligible for entry into the PPS db 27. In some embodiments, weighting factor assignment and adjustment, or reset and attenuation can be similar to that described above.

In some other embodiments using multiple temporal layers, a separate PPS db 27 can be maintained for each temporal layer in use. For the PPS database maintained for temporal layer k, only a PPS signaled at temporal layer k or lower is eligible to be put into the database.

Figure 7:
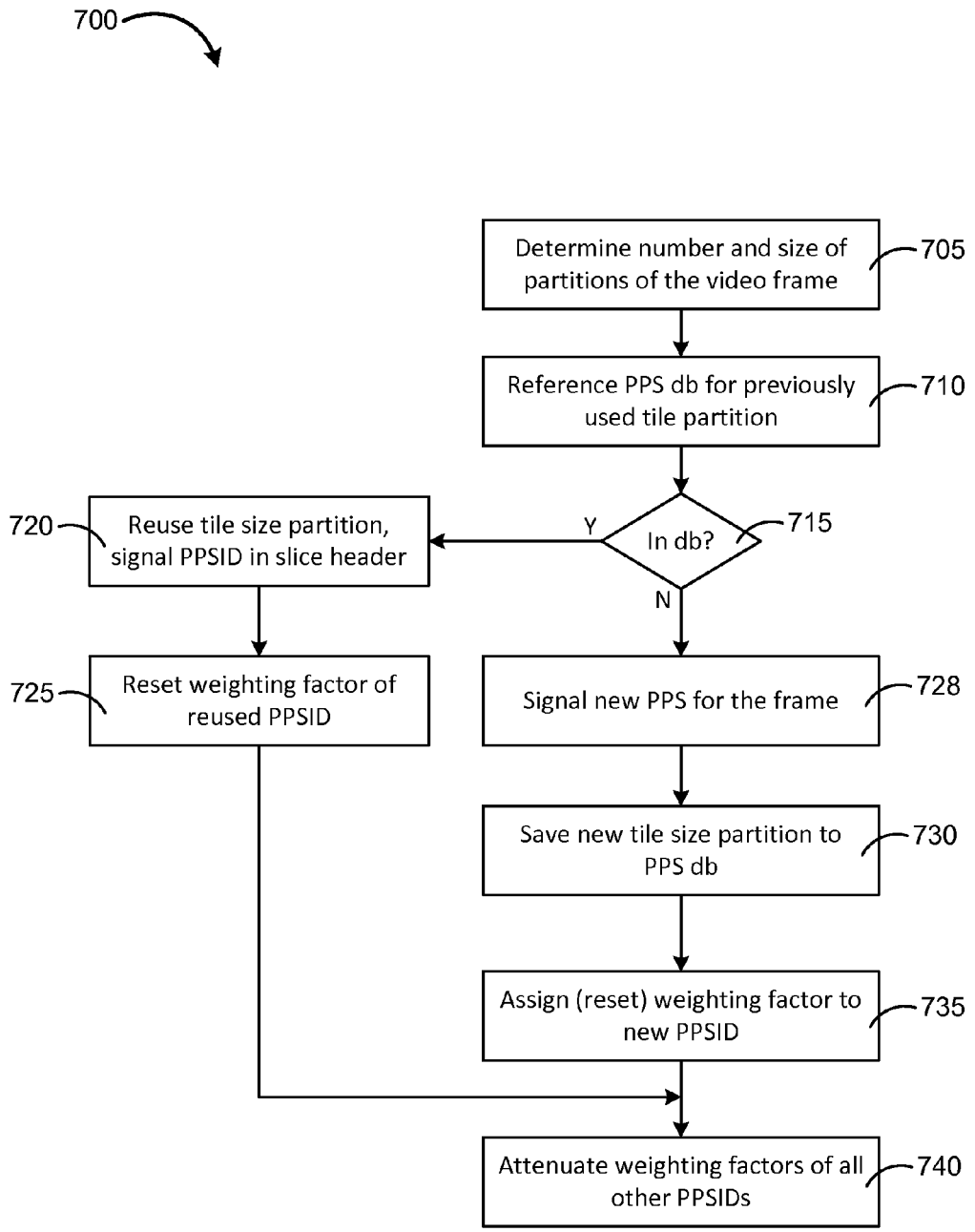
FIG. 7 is a flowchart of a method for managing PPS identifier database.

FIG. 7 is a flowchart of a method for managing PPS identifier database which can be carried out by the encoder 20. A method 700 starts at block 705. In some embodiments, the method 700 can be performed during or concurrent with video encoding. At step 705, the encoder 20 can determine a tile size partition 614 for the current video frame 205. The encoder 20, and more specifically the partitioning module 35, can determine how many partitions are required within the current video frame 205. The partitioning module 35 can further determine the size(s) of each of the tiles 210 (FIG. 2). The size and number of the tiles 210 can be based on the computation complexity of the video frame 205. In some embodiments, the partitioning module 35 can further base the number and size of tiles on a previously coded video frame 205. In some embodiments, the current video frame 205 can have an unequal distribution of motion or content variation. For example, motion of the subject of the video can be centered in the current video frame 205 (e.g., the partition 71b of FIG. 2). The partitioning module 35 can then determine how to partition the current video frame 205 to more evenly distribute, or parallelize, computation complexity across the tiles 210. The variable size and number of the tiles 210 can enable the encoder 20 to encode multiple, different sized tiles 210 in equivalent or similar amounts of time.

At step 710, the encoder 20 can reference the PPS db 27 to determine whether a previously used PPSID is associated with or references the same tile size partition 614 required for encoding the current video frame 205.

At decision step 715 the encoder 20 can determine whether a PPSID presently saved in the PPS db 27 (e.g., the PPS_3 606) references the desired tile size partition 614 for coding the current video frame 205. If the tile size partition 614 is present in the PPS db 27, the method 700 moves to step 720. At step 720 the encoder 20 can reuse a PPSID (e.g., the PPS_3 606) in the PPS db 27 for encoding the current video frame 205. In some embodiments, the encoder 20 can then signal the PPSID referencing the tile size partition 614 in a slice header, instead of signaling an entire PPS.

At step 725, the encoder 20 can reset the weighting factor of the recently used PPSID (e.g., the PPS_3 606).

At step 740 the encoder can further attenuate the weighting factors of the other PPSIDs in the PPS db 27 that are not used for encoding the current video frame 205.

At the decision step 715, if the tile size partition 614 is not associated with any of the PPSIDs presently saved in the PPS db 27, a new PPS can be signaled for the current video frame 205 at step 728 indicating the tile size partition 614. The term "signal," or "signaling," as used herein can generally refer to determining one or more syntaxes for the desired function or action, encoding a data (e.g., a video data or a video data block) based on the one or more syntaxes, and transmitting encoded video data (via, e.g., the link 16) to the decoder 30, for example.

At step 730, a new tile size partition 614 can be saved to the PPS db 27 and referenced to a new PPSID (e.g., the PPS_m). In some embodiments, this may require overwriting another tile size partition 614 with an old or existing PPSID (e.g., the PPS_m) having the lowest weighting factor in the PPS db 27. For example, such overwriting may occur when the number of PPS records saved in the PPS db 27 already reaches the full capacity of the database.

At step 735, the referred PPSID, PPS_m for example, can be assigned a weighting factor within the PPS db 27. In some embodiments, the assignment of a weighting factor to a PPSID (e.g., the PPS_m) can be considered a "reset."

At step 740 the encoder can further attenuate the weighting factors of the other PPSIDs saved in the PPS db 27 that are not used in the current video frame 205.

Accordingly, using the method 700, the PPS db 27 can be maintained with a current listing of the recently used or recently referred tile size partitions. This may allow the encoder 20 to reduce the PPS signaling overhead required to signal tile size partitions by referring to PPSIDs of previously signaled PPSs.

Information and signals disclosed herein may be represented using any of a variety of different technologies and methods. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will appreciate that the various illustrative blocks and modules described in connection with the embodiments disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the disclosure. In addition, the grouping of functions within a module, block, or step is for ease of description. Specific functions or steps can be moved from one module or block or distributed across to modules or blocks without departing from the disclosure.

The embodiments described herein may be implemented in hardware, software, firmware, or any combination thereof. Such embodiments may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the methods may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The methods additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the methods and processes described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the methods described herein. In addition, in some aspects, the functionality described herein may be provided within dedicated software modules or hardware modules configured for encoding and decoding, or incorporated in a combined video encoder-decoder (CODEC).

Although embodiments of the disclosure are described above for particular embodiment, many variations of the disclosure are possible. For example, the numbers of various components may be increased or decreased, modules and steps that determine a supply voltage may be modified to determine a frequency, another system parameter, or a combination of parameters. Additionally, features of the various embodiments may be combined in combinations that differ from those described above.

The above description of the disclosed embodiment is provided to enable any person skilled in the art to make or use the disclosure. Various modifications to these embodiments will be readily apparent to those skilled in the art, and the generic principles described herein can be applied to other embodiment without departing from the spirit or scope of the disclosure. Thus, it is to be understood that the description and drawings presented herein represent a presently preferred implementation of the disclosure and are therefore representative of the subject matter which is broadly contemplated by the present disclosure. It is further understood that the scope of the present disclosure fully encompasses other embodiment that may become obvious to those skilled in the art and that the scope of the present disclosure is accordingly limited by nothing other than the appended claims.

What is claimed is:

1. A method of encoding video data using variable tile size partitions and reusing previously used tile size partitions, comprising:
    determining, by at least one processor, a tile size partition for a frame of video data;
    comparing, by the at least one processor, the tile size partition for the frame of video data with a plurality of tile size partitions stored in a database to determine whether the tile size partition for the frame of video data is equivalent to one of the plurality of tile size partitions stored in the database, each of the plurality of tile size partitions stored in the database being associated with a corresponding picture parameter set identifier (PPSID), the database being stored in a memory coupled to the at least one processor;
    in response to determining that the tile size partition for the frame of video data is not equivalent to any one of the plurality of tile size partitions stored in the database:
        signaling, by the at least one processor, a picture parameter set (PPS) including the tile size partition for the frame of video data; and
        storing the tile size partition for the frame of video data in the database; and
    in response to determining that the tile size partition for the frame of video data is equivalent to one of the plurality of tile size partitions stored in the database:
        retrieving the corresponding PPSID associated with the one of the plurality of tile size partitions stored in the database that is equivalent to the tile size partition for the frame of video data from the memory; and
        signaling, by the at least one processor, the corresponding PPSID in a slice header.

2. The method of claim 1, further comprising:
    determining the tile size partition based on a distribution of computation complexity across the frame of video data; and selecting a number and a size of a plurality of tiles of the tile size partition based on the computation complexity.

3. The method of claim 1 further comprising:
assigning a weighting factor to a PPSID associated with the tile size partition for the frame of video data, the weighting factor of the PPSID being stored in the database with the PPSID and the tile size partition for the frame of video data.

4. The method of claim 3 further comprising:
resetting a weighting factor of the corresponding PPSID associated with the tile size partition in the database when it is equivalent to the tile size partition for the frame of video data.

5. The method of claim 3 further comprising:
attenuating a weighting factor of each PPSID associated with each tile size partition of the plurality of tile size partitions stored in the database when the tile size partition for the frame of video data is not equivalent to any of the plurality of tile size partitions stored in the database.

6. The method of claim 3 further comprising resetting a weighting factor of the corresponding PPSID to a maximum value; and
attenuating a weighting factor of existing PPSIDs associated with each tile size partition of the plurality of tile size partitions stored in the database when the tile size partition for the frame of video data is not equivalent to any one of the plurality of tile size partitions stored in the database.

7. The method of claim 3 further comprising assigning a weighting factor of zero to the PPSID associated with the tile size partition for the frame of video data; and
incrementing the weighting factor of the PPSID associated with the tile size partition for the frame of video data when the PPSID associated with the tile size partition for the frame of video data is the corresponding PPSID associated with the one of the plurality of tile size partitions stored in the database that is equivalent to the tile size partition for the frame of video data.

8. The method of claim 3 further comprising replacing the tile size partition associated with the PPSID in the database having a smallest weighting factor with the tile size partition associated with the frame of video data when the tile size partition for the frame of video data is not equivalent to any one of the plurality of tile size partitions stored in the database.

9. The method of claim 1 wherein the frame of video data is a temporal layer of a plurality of temporal layers in a scalable video data stream, and
wherein the tile size partition and the corresponding PPSID are stored in a temporal layer database based on the temporal layer.

10. The method of claim 1 wherein the frame of video data is a base layer of a plurality of temporal layers in a scalable video data stream.

11. A device for encoding video data using variable tile size partitions, comprising:
a memory unit having a database, the database having a plurality of tile size partitions, each tile size partition of the plurality of tile size partitions being associated with a corresponding picture parameter set identifier (PPSID); and
at least one processor configured to:
determine a tile size partition for a frame of video data,
compare the tile size partition for the frame of video data with the plurality of tile size partitions stored in the database to determine whether the tile size partition for the frame of video data is equivalent to one of the plurality of tile size partitions stored in the database,
in response to determining that the tile size partition for the frame of video data is not equivalent to any one of the plurality of tile size partitions stored in the database:
signal a picture parameter set (PPS) including the tile size partition for the frame of video data, and
store the tile size partition for the frame of video data in the database, and
in response to determining that the tile size partition for the frame of video data is equivalent to one of the plurality of tile size partitions stored in the database:
retrieve the corresponding PPSID associated with the one of the plurality of tile size partitions stored in the database that is equivalent to the tile size partition for the frame of video data, and
signal the corresponding PPSID in a slice header.

12. The device of claim 11, wherein the processor is further configured to:
determine the tile size partition based on a distribution of computation complexity across the frame of video data; and
select a number and a size of a plurality of tiles of the tile size partition based on the computation complexity.

13. The device of claim 11, wherein the processor is further configured to assign a weighting factor to a PPSID associated with the tile size partition for the frame of video data, the weighting factor of the PPSID being stored in the database with the PPSID and the tile size partition for the frame of video data.

14. The device of claim 11, wherein the processor is further configured to reset a weighting factor of the corresponding PPSID associated with the tile size partition in the database when it is equivalent to the tile size partition for the frame of video data.

15. The device of claim 11, wherein the processor is further configured to attenuate a weighting factor of each PPSID associated with each of the tile size partitions of the plurality of tile size partitions stored in the database when the tile size partition for the frame of video data is not equivalent to any of the plurality of tile size partitions stored in the database.

16. The device of claim 11, wherein the processor is further configured to:
reset a weighting factor of the corresponding PPSID to a maximum value; and
attenuate a weighting factor of existing PPSIDs associated with each tile size partition of the plurality of tile size partitions stored in the database when the tile size partition for the frame of video data is not equivalent to any one of the plurality of tile size partitions stored in the database.

17. The device of claim 11, wherein the processor is further configured to:
assign a weighting factor to zero to the PPSID associated with the tile size partition for the frame of video data; and
increment the weighting factor of the PPSID associated with the tile size partition for the frame of video data when the PPSID associated with the tile size partition for the frame of video data is the corresponding PPSID associated with the one of the plurality of tile size partitions stored in the database that is equivalent to the tile size partition for the frame of video data.

18. The device of claim 11, wherein the processor is further configured to:

replace the tile size partition associated with the PPSID in the database having a smallest weighting factor with the tile size partition associated with the frame of video data when the tile size partition for the frame of video data is not equivalent to any one of the plurality of tile size partitions stored in the database.

19. An apparatus for encoding video data using variable tile size partitions, comprising:
a storage means configured to store a plurality of tile size partitions, each tile size partition of the plurality of tile size partitions being associated with a corresponding picture parameter set identifier (PPSID);
a determining means configured to determine a tile size partition for a frame of video data;
a signaling means configured to transmit a picture parameter set (PPS);
a comparing means configured to compare the tile size partition for the frame of video data with the plurality of tile size partitions stored by the storage means to determine whether the tile size partition for the frame of video data is equivalent to one of the plurality of tile size partitions stored by the storage means;
in response to the determining means determining that the tile size partition for the frame of video data is not equivalent to any one of the plurality of tile size partitions stored by the storage means:
the signaling means is further configured to signal a PPS including the tile size partition for the frame of video data; and
the storage means is further configured to store the tile size partition for the frame of video data; and
in response to the determining means determining that the tile size partition for the frame of video data is equivalent to one of the plurality of tile size partitions stored by the storage means:
the comparing means is further configured to retrieve the corresponding PPSID associated with the one of the plurality of tile size partitions stored by the storage means that is equivalent to the tile size partition for the frame of video data; and
the signaling means is further configured to signal the corresponding PPSID in a slice header.

20. The apparatus of claim 19, wherein the determining means, the signaling means, and the comparing means comprise one or more processors.

21. The apparatus of claim 19, wherein the comparing means is further configured to:
determine the tile size partition based on a distribution of computation complexity across the frame of video data; and
select a number and a size of a plurality of tiles of the tile size partition based on the computation complexity.

22. The apparatus of claim 19, wherein the comparing means is further configured to assign a weighting factor to a PPSID associated with the tile size partition for the frame of video data, the weighting factor of the PPSID being stored in the database with the PPSID and the tile size partition for the frame of video data.

23. The apparatus of claim 19, wherein the comparing means is further configured to reset a weighting factor of the corresponding PPSID associated with the tile size partition in the database when it is equivalent to the tile size partition for the frame of video data.

24. The apparatus of claim 19, wherein the comparing means is further configured to attenuate a weighting factor of each PPSID associated with each of the tile size partitions of the plurality of tile size partitions stored in the database when the tile size partition for the frame of video data is not equivalent to any of the plurality of tile size partitions stored in the database.

25. The apparatus of claim 19, wherein the comparing means is further configured to:
reset a weighting factor of the corresponding PPSID to a maximum value; and
attenuate a weighting factor of existing PPSIDs associated with each tile size partition of the plurality of tile size partitions stored in the database when the tile size partition for the frame of video data is not equivalent to any one of the plurality of tile size partitions stored in the database.

26. The apparatus of claim 19, wherein the comparing means is further configured to:
assign a weighting factor to zero to the PPSID associated with the tile size partition for the frame of video data; and
increment the weighting factor of the PPSID associated with the tile size partition for the frame of video data when the PPSID associated with the tile size partition for the frame of video data is the corresponding PPSID associated with the one of the plurality of tile size partitions stored in the database that is equivalent to the tile size partition for the frame of video data.

27. A method of encoding video data using variable tile size partitions, comprising:
selecting, by at least one processor, a first size partition based on a computation complexity of a first frame of video data;
signaling, by the at least one processor, in syntax information a picture parameter set (PPS) indicating the first tile size partition for the frame of video data;
storing, by the at least one processor, the first tile size partition in a database, the database configured to store a plurality of tile size partitions, each tile size partition of the plurality of tile size partitions being associated with a corresponding PPS identifier (PPSID);
determining, by the at least one processor, a second tile size partition for a second frame of video data; and
in response to determining that the second tile size partition is the same as the first tile size partition:
retrieving, by the at least one processor, the first tile size partition from the database; and
signaling, by the at least one processor, the PPSID associated with the first tile size partition in a slice header;
in response to determining that the second tile size partition differs from the plurality of tile size partitions stored in the database:
signaling, by the at least one processor, in syntax information a second PPS indicating the second tile size partition for the second frame of video data; and
storing the second tile size partition in the database.

28. The method of claim 27, further comprising:
assigning, by the at least one processor, a weighting factor to the corresponding PPSID for the first tile size parameter;
resetting, by the at least one processor, the weighting factor of the corresponding PPSID for the first tile size parameter when the second tile size partition is the same as the first tile size partition; and
attenutating, by the at least one processor, the weighting factor of the corresponding PPSID for the first tile size parameter when the second tile size partition is differs from the first tile size partition.

29. The method of claim 27, further comprising replacing a tile size partition associated with the PPSID in the database having a lowest weighting factor when storing the second tile size partition in the database.

30. The method of claim 27, further comprising, in the present of multiple temporal layers, signaling a PPS indicating a tile size partition for the base layer, but not an enhancement layer.

* * * * *